US011315178B1

(12) United States Patent
Ridenour et al.

(10) Patent No.: US 11,315,178 B1
(45) Date of Patent: Apr. 26, 2022

(54) SPECIAL PURPOSE SYSTEMS

(71) Applicant: Coinbase, Inc., San Francisco, CA (US)

(72) Inventors: Andrew Ridenour, Washington, DC (US); Paul Bauerschmidt, Chicago, IL (US)

(73) Assignee: Coinbase, Inc., San Francisco, CA (US)

( * ) Notice: Subject to any disclaimer, the term of this patent is extended or adjusted under 35 U.S.C. 154(b) by 124 days.

(21) Appl. No.: 16/538,577

(22) Filed: Aug. 12, 2019

(51) Int. Cl.
| | | |
|---|---|---|
| *G06Q 40/00* | (2012.01) | |
| *G06Q 40/02* | (2012.01) | |
| *G06Q 20/06* | (2012.01) | |
| *G06Q 20/36* | (2012.01) | |
| *G06Q 20/38* | (2012.01) | |

(52) U.S. Cl.
CPC ....... *G06Q 40/025* (2013.01); *G06Q 20/0658* (2013.01); *G06Q 20/3678* (2013.01); *G06Q 20/389* (2013.01); *G06Q 2220/00* (2013.01)

(58) Field of Classification Search
CPC ............ G06Q 40/025; G06Q 20/0658; G06Q 20/3678; G06Q 20/389; G06Q 2220/00
See application file for complete search history.

(56) References Cited

U.S. PATENT DOCUMENTS

| 5,940,812 | A * | 8/1999 | Tengel .................. G06Q 40/04 705/38 |
| 2017/0024813 | A1 * | 1/2017 | Crouspeyre .......... G06Q 40/025 |
| 2017/0270492 | A1 * | 9/2017 | Donovan ............... G06Q 20/40 |
| 2019/0114704 | A1 * | 4/2019 | Way ..................... G06Q 40/025 |
| 2019/0303807 | A1 * | 10/2019 | Gueye .................... G06Q 10/02 |
| 2020/0151709 | A1 * | 5/2020 | Bryan ................ G06Q 20/3672 |
| 2020/0225984 | A1 * | 7/2020 | Kancharla ............. G06F 9/4881 |

FOREIGN PATENT DOCUMENTS

KR 20200006243 A * 1/2020

* cited by examiner

*Primary Examiner* — Patrick McAtee
*Assistant Examiner* — Terry Nathan Murray
(74) *Attorney, Agent, or Firm* — Perkins Coie LLP (57) ABSTRACT

A system and method receive a plurality of crypto profiles that include customizable rules for different cryptocurrencies and operating state information that initialize containerized lending applications. The system and method ink the crypto profiles to a matching engine before the containerized lending applications and the matching engine match a plurality of borrower requests for a debt or an equity denominated in a cryptocurrency to lending requests. The system and method collect cryptocurrency payments in response to the use of the debt or the equity by the borrower. Each containerized lending application include executable software, runtime code, system tools, and system libraries that enable the containerized applications to run on two or more computing environments without modification.

20 Claims, 8 Drawing Sheets

SPECIAL PURPOSE SYSTEMS

BACKGROUND OF THE DISCLOSURE

1. Technical Field

This disclosure relates to entities that isolate risk, and specifically to, systems that isolate financial and technical risk when lending cryptocurrency-based assets.

2. Related Art

Special purpose entities protect against business risk. They off load financial assets and liabilities and limit the reporting requirements of the sponsoring ventures. Some protect assets and funds against bankruptcy and creditors, and others provide sponsors with the freedom to operate. Some are not under the regulatory burden of their sponsors.

While the purposes of special purpose entities are limited, they have many structures. While a sponsoring company is often protected against business risk, the underlying assets and liabilities under the entities' control are typically intermixed and not protected against financial risk or technical risk.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

The disclosed special purpose vehicle systems and processes (referred to as the SPV system or systems) minimize financial and technical risk associated with an activity or a series of activities such lending debt or equity denominated in cryptocurrency. This is also referred to as crypto assets. Through a sponsor or an originator, the systems transfer crypto assets through direct lending and/or lending pools. The assets are logically and electronically separated by asset types and may include any form of debt or equity and cryptocurrency including Bitcoin (BTC), Ethereum (ETH), Stablecoin (USDC), etc. Ownership is tracked by user accounts, cold storage, hot wallets, addresses, and entities including centralized entities (like Coinbase®) or exchanges that may maintain user accounts. Unlike cold storage that are devices not connected to the Internet, hot wallet devices are connected to one or more networks like the internet.

Eligible contract participants, retail customers, and/or centralized entities may provide the crypto assets loaned for the repayment of value, interest payments in cryptocurrency (not fiat), and/or other considerations. In an exemplary peer-to-peer system, matching engines match borrowers to lenders, allowing the system to automatically track and enforce positions, interest payments in cryptocurrency (not fiat), margin requirements, forced liquidations and/or loan closures. In this system, the collateralized debt and/or equity and margin requirements are customized to the investors with the lender bearing the risk of default. In exemplary limited lending-pool systems, matching engines match borrowers to lenders allowing the system to automatically track and enforce positions, interest payments made in cryptocurrency (e.g., crypto), margin requirements, forced liquidations, and/or loan closures. In this system, loan terms and margin requirements are set by predetermined rules (e.g., interest rates are set at a floating interest rate and a margin requirement of 150% for BTC/ETH and 50% for USDC is enforced) and the lenders and borrowers bear the risk of default. The rules may be stored in downloadable crypto profiles that convey granular information associated with the transaction type. The downloadable crypto profile may be linked to the lending applications (and/or the matching engines) before a transaction is received by the peer-to-peer systems, limited lending-pool systems, and/or turn key lending-pool systems. In exemplary turn-key lending-pool systems, the systems' matching engines match borrowers to lenders and automatically via lending pools and automatically track and enforce positions, interest payments in crypto, margin requirements, forced liquidations, loan closures, and make use of crypto profiles. Loan terms and margin requirements, amongst the other requirements, are assigned by predetermined rules that may be included in the crypto profiles. In this system, lenders and borrowers bear the default risk and margin trading occurs through the system's user interfaces.

Downloadable crypto profiles provide a more flexible and nuanced approach to peer-to-peer and pool-based lending systems as it allows SPV systems to intelligently distribute the crypto rules to one or more local and/or remote clusters or lending applications that serve various remote and/or local SPV systems. Further, device administrators can easily customize the rules by applying different operating rules and policies to different lending applications and/or clusters (e.g., lending systems) while they execute concurrently and/or provide different datasets to configure different lending applications or clusters. Having different crypto profiles that may include customized directives for different crypto products, customizable rules, and/or operating state information that initialize lending applications (e.g., matching engines) and clusters enables administrators to construct operating policies with a high degree of granularity. It also enables administrators to alter those operating policies and rules by changing directives (e.g., instructions) and rules in real time during a computer session in response to evolving events or market failures, interfering events, and pre-event or pre-failure states.

To maintain isolation and decouple the systems from particular servers and malicious computing environments, each system may be deployed on separate clusters (e.g., a peer-to-peer cluster, a limited lending-pool cluster, a turn-key lending-pool cluster) and each asset type is serviced by separate containerized lending applications and matching engines deployed through standalone software units that package up the application code, its dependencies, its runtime system tools, system libraries (e.g., autonomous code) and share the servicing machine's operating system. Runtime describes software/instructions that are executed while the program is running, including those instructions that are not written in the lending application code, but are necessary for its proper execution. System tools refer to computer programs used for implementing different tasks in the lending application code. Since each software application does not require separate operating system (OS) instances and it includes everything it needs to run the application, the asset applications are lightweight (e.g., consume less memory), portable (e.g., run on different OS machines having different form factors), and are secure. Further, the full integration allows the lending application code to run quickly and reliably from one computing environment to another without modification.

Like the legal isolation special purpose vehicles provide sponsors and originators, the disclosed standardized units of software and/or downloadable crypto profiles isolate application code from non-demilitarized environments and malicious rules and ensures the software functions uniformly on different machines despite differences in OS, computing environments, and exposure to malicious software.

The term cluster refers to a group of independent network servers that operate and appear to clients as if they were a single unit. Clustering improve network capacity by, among other things, enabling the servers within a cluster to shift work in order to balance the load by the processes described below. By enabling one server to take over for another (e.g., fault tolerance), clustering also enhances network stability and minimizes or eliminates downtime caused by a lending application failure or SPV system failure.

Figure 1:
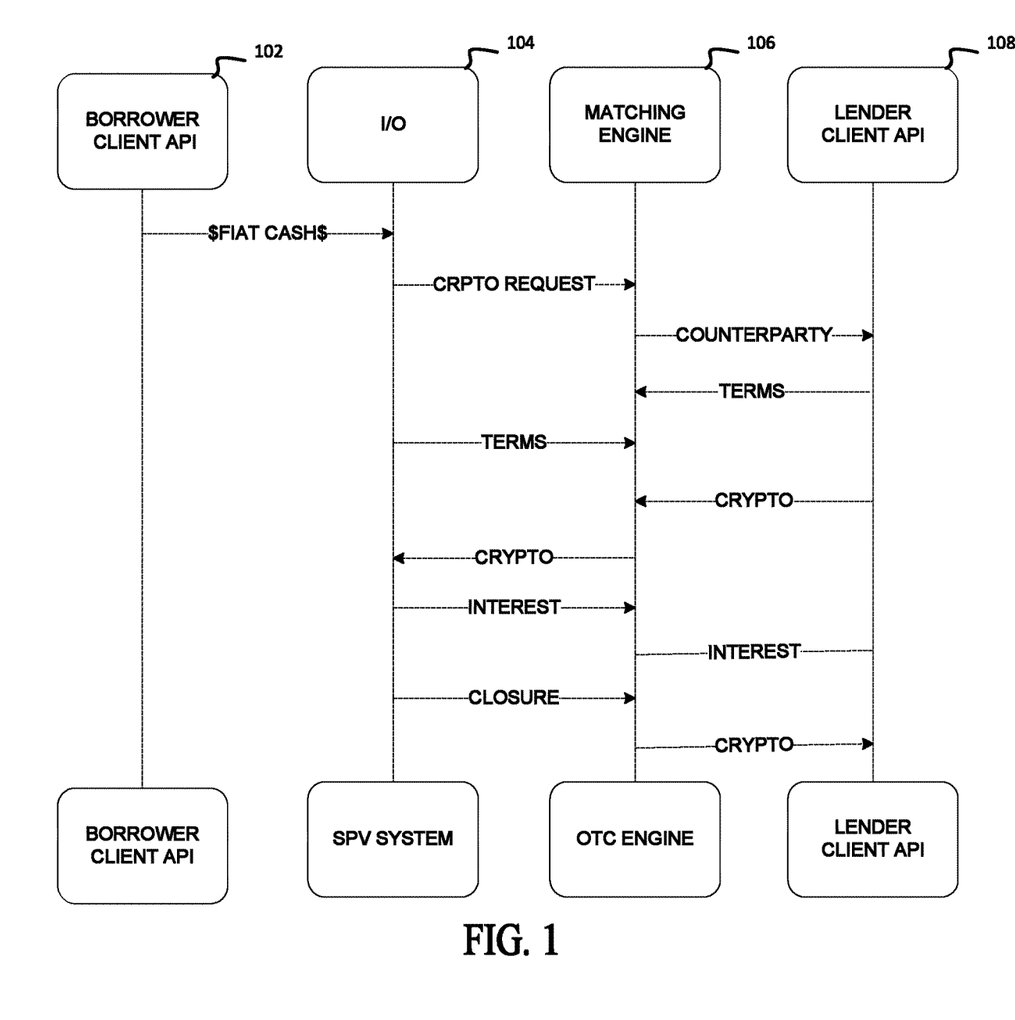
FIG. 1 is a peer-to-peer cryptocurrency lending cycle.

In an exemplary peer-to-peer cryptocurrency lending process shown in FIG. 1, the system receives a request for a crypto loan through a user device (e.g., computing system, smartphone, etc.) 102. The request may include: an asset identifier (e.g., a cryptocurrency name, public key, etc.), the amount of the cryptocurrency a user requests to borrow, a calculated margin requirement, and/or other related information. The request may be preceded by a tendering of the margin requirement in fiat currency that may come from the user's margin account. In practice, a lien is automatically placed on the borrower's margin account in the amount of the initial margin requirements when the request is received at the I/O 104. Any amount of money above the initial margin requirement level may be withdrawn without restriction. If the market value of the borrowed asset changes, the hold and maintenance margin requirement change to reflect the borrowed assets changing market value. As the price of the borrowed asset increases, the value of the hold and maintenance margin requirement increases. Conversely, as the price of the borrowed asset decreases, the value of the hold and maintenance margin requirement decreases.

In response to the request, the matching engine 106 matches counter parties and renders bespoke terms via the APIs 102 and 108. The customized terms determine the asset type, the interest rates, the loan's duration, the initial margin requirements, the spread or staking fee (e.g., the fee tendered to the matching engine by the borrower client for making the loan) and the other obligations assigned to the borrowers and the lenders.

Figure 3:
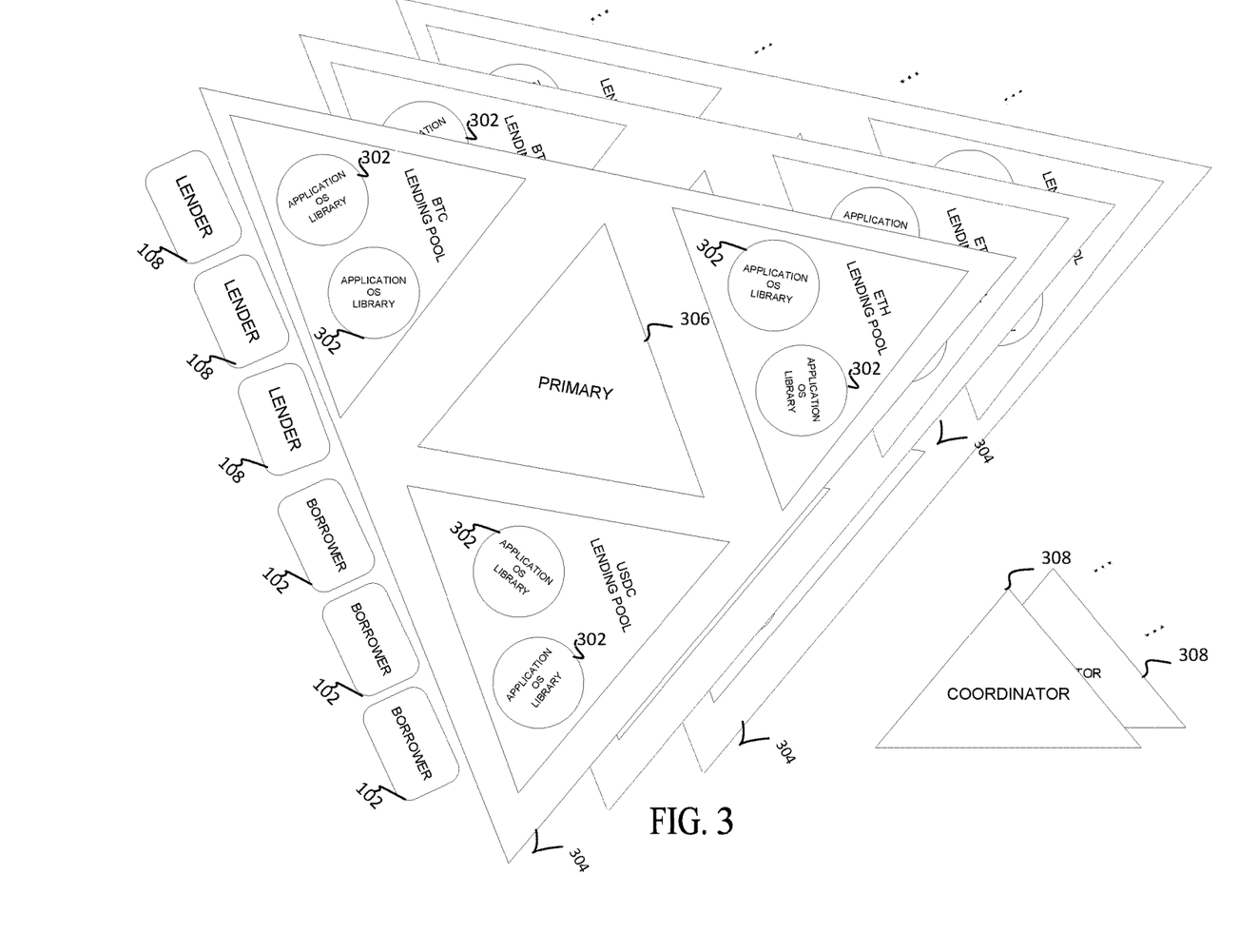
FIG. 3 illustrates a special purpose vehicle system.

By rule, matching engines enforce certain lending requirements such as, for example, minimums on: loan sizes (e.g., $100,000 USD (notional amount for crypto), loan durations (increments of 7 days), loan spread (within a range of about 0.5%), marking (e.g., the price used to calculate the daily interest rate in cryptocurrency), initial margin requirements (e.g., BTC/ETH—150% of the value of the loan, USDC—100% of the value of the loan, etc.), the timing and forms of interest payments (e.g., borrower pays/lender receives payments in cryptocurrency each day), the funding requirements (e.g., borrower maintains a predetermined amount funds on the system during the loan's life), and the margin account requirements (e.g., an indicative margin requirement between 1.2 to 1.5 times the loan amount during loan pendency, no rehypothecations are permitted). Here, the rules are part of a crypto profile that are downloaded and linked to the matching engine 106 and/or lending application 302 before the matching engine 106 and/or lending application 302 is available to a client API 106 and 108 or during the system's execution.

Execution of the terms by parties results in a loan confirmation and the lending of the debt and/or equity. In FIG. 1 interest payment is calculated based on a current price and volume weighted average price formula. The current price is the twenty-four-hour weighted average price for the given crypto currency-based asset priced in US dollars. The price is updated regularly to reflect price movements. It is either marked continuously or at short time intervals (e.g., 1 min, 5 mins., etc.). The interest payment is calculated by adding up the crypto currency traded for each transaction (e.g., the current price times the number of crypto coins traded) and then dividing the sum by the total shares traded. Table 1 is an exemplary interest rate schedule for a seven-day loan.

TABLE 1

|  | Day 1 | Day 2 | Day 3 | Day 4 | Day 5 | Day 6 | Day 7 | Total |
| --- | --- | --- | --- | --- | --- | --- | --- | --- |
| BTC Price | $3,800 | $4,000 | $4,200 | $4,400 | $4,600 | $4,400 | $4,200 |  |
| Loan (BTC) | 100 | 100 | 100 | 100 | 100 | 100 | 100 |  |
| Interest (12%) | 0.0329% | 0.0329% | 0.0329% | 0.0329% | 0.0329% | 0.0329% | 0.0329% |  |
| Interest | $124.93 | $131.51 | $138.08 | $144.66 | $151.23 | $144.66 | $138.08 | $973.15 |
| Spread (0.5%) | 0.0014% | 0.0014% | 0.0014% | 0.0014% | 0.0014% | 0.0014% | 0.0014% |  |
| matching Engine fee | $5.21 | $5.48 | $5.75 | $6.03 | $6.30 | $6.03 | $5.75 | $40.55 |

Figure 2:
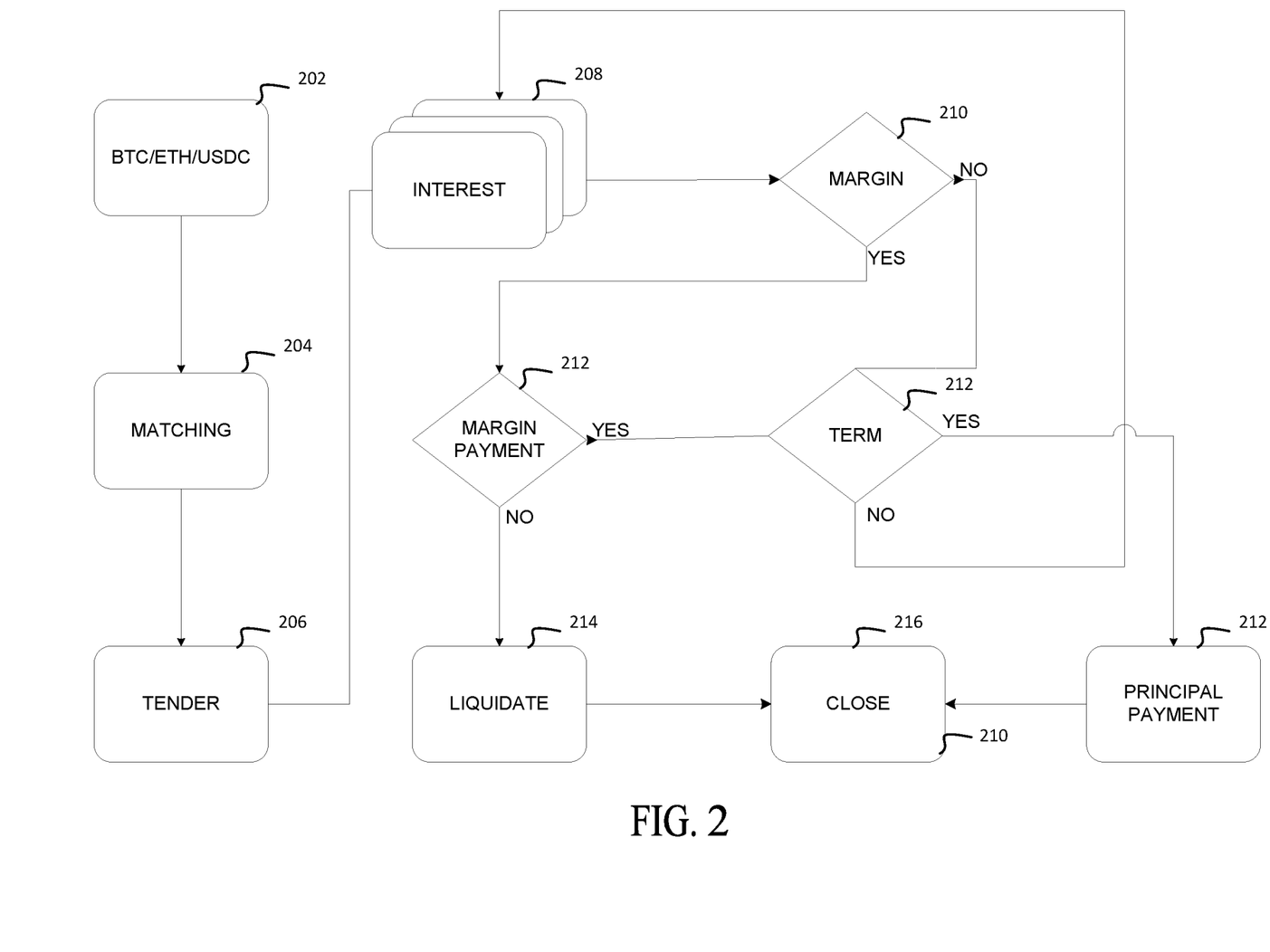
FIG. 2 is an exemplary cryptocurrency lending cycle.

FIG. 2 is a method controlled by an off-chain entity (e.g., an off the blockchain entity), an off-chain exchange registered with one or more national regulatory bodies, or alternatively by a distributed entity (e.g., a distributed exchange). A blockchain is a list of validated blocks, each linking to its predecessor, all the way to the genesis block. The genesis block is the first block in the block chain, used to initialize the cryptocurrency. A block is a grouping of transactions, marked with a timestamp, and a fingerprint (i.e., a distinctive and unique identifying mark or characteristic) associated only with or assigned to the previous block In FIG. 2, the position management logic begins with a client API 102 transmitting a request to the SPV system or matching engine 106 requesting a loan amount at 202. The request may include the details described above and may be preceded by a tendering of the margin requirement that may come from the user's margin account. The matching engine 106 directly matches the counter parties at 204, or in an alternative, renders a size or random matching via a marketplace exchange at 204. With a match, the matching engine 106 or marketplace exchange (referred to hereinafter as the matching engine) transmits confirmation details detailing the terms of the loan to the borrower that the lender confirms via APIs 102 and 108. Once the loan is confirmed, the loan proceeds are moved to the borrower at 206 and the matching engine 106 enforces the loan's terms by collecting and remitting interest payments collected in crypto and monitoring the margin at 208 and 210. As shown, interest payments are calculated daily and collected iteratively on a predetermined schedule. When a borrower's margin account falls below a predetermined threshold at 210, a margin call is initiated. An electronic message may notify the borrower that the borrower's position is at risk of liquidation. The notification will report the borrower's liquidation price and the amount that the borrower needs to deposit into his/her margin account to return the account to a margin maintenance amount. Exemplary margin requirements for crypto currency and USDC is shown in Table 2 showing exemplary percentages for the initial margin requirements, the levels when margin call events occur, and the levels when a liquidation event automatically occurs.

TABLE 2

| Margin % | Crypto | USDC |
|---|---|---|
| Initial Margin Requirement | 150% | 100% |
| Margin Call Initiated | 100% | 50% |
| Liquidation | 80% | 25% |

In Table 2, the margin percentage equals the portfolio value of margin account less the notional value of loan. Thus, if a client device wants to borrow one million dollars of BTC, the client device posts one-hundred and fifty percent or one point five million dollars to the client device margin account. In this example, the client device will start out with one million plus one-point five million initial margin or two-point five million dollars in its margin account. Should the portfolio value of the margin account fall to two million, the margin percentage will fall to one-hundred percent (($2M–$1M)/$1M=100%) and the matching engine 106/system engine to automatically initiates a margin call, that if paid at 212 place the loan in good standing and continues the daily calculation and collection of interest payments for the duration of the loan term at 208 and 212. Should the notional value of the loan fall to one-point eight million, the margin percentage will fall to eighty percent (($1.8M–$1M)/$1M=80%). This level causes the matching engine 106/system engine to automatically freeze all funds in the client's margin account and the other user accounts if the accounts are in the custody of a centralized exchange. The accounts are then liquidated up to the point in which the borrowed asset is recovered at 214 and the loan is closed out at 216. In some instances, funds may be liquidated based on a current price and volume weighted average price formula repurchase if the asset is a cryptocurrency. The matching engine 106/system engine executes the same functionality for Stablecoin (USDC) loans by applying the exemplary percentages shown in Table 2, with the exception that borrowed Stablecoin USDC in the process is sold when a liquidation event occurs. The loan processes close with the repayment of the principal at 216, which often occur faster than conventional loans because crypto rails typically operate faster than fiat rails.

Multiple instances of the methods described herein can be concurrently performed (e.g., in parallel or in series) for or on different sets of cryptographic assets, a mix of cryptographic assets, on different exchanges, and/or using different cryptographic systems. Alternatively, a single instance of the methods described herein can be performed at any time. The processes may deploy a peer-to-peer system, a limited lending-pool system, and/or the turn-key lending-pool system on different clusters.

The peer-to-peer system allows bilateral parties to execute loan agreements that are tracked and enforced by the matching engine 106, with the lenders bearing the full risk of default. The limited lending-pool system matches lenders to borrowers in aggregate via an asset pool (e.g., it removes the 1:1 lenders-borrowers constraint) that may be aggregated by a controller. Like the peer-to-peer system, the loans are tracked and enforced by the matching engine 106, with the lenders and borrowers bearing the full risk of default. The turn-key lending system matches lenders to borrowers like an exchange such as by size matching and by random matching, for example via a matching engine 106. In a size matching, an exemplary 1000 shorts loan contracts (lenders) at clients of firm A are automatically matched by the matching engine 106 to the 1000 long loan contracts (borrowers) at clients of firm B. The 100 short loan contracts at client C are then assigned by the matching engine 106 to firms D or E, each of which may have 100 long loan contracts to deal. Any remaining short loan contracts are assigned to the remaining long positions by the matching engine's 106 random selection of firms and/or contracts, which completes the exemplary process.

The use of containers makes the lending applications and other applications portable among many systems running a container-supported operating systems. By placing the standalone lending applications in separate containers (referred to as lending application nodes 302) and automating deployment through clusters 304, scaling, and management via primary nodes 306 and coordinator nodes 308, the system automatically scales to application use and user demand. In other words, this architecture does not require multiple servers running at all times and is not tied to a particular machine. The systems utilize coordinator nodes 308 for the orchestration and management of the clusters 306. An agent may operate within containers and may communicate with the primary node 306 which communicate with other containerized applications. The management, orchestrations, and communication links enable the cluster to meet demand and distribute loads. In FIG. 3, the containers are depicted by the enclosure of the standalone lending pool applications 302, which include the processing and their libraries among the others computer objects that include variables, data structures, and/or functions.

In FIG. 3, each primary node 306 may coordinate activities in a particular cluster 304 including the scheduling of the applications, maintaining operating state, updating of the lending application nodes 302, and provide or relay crypto profiles. Through the coordinator cluster 308, some systems track running loads, resource availability, and their respective states. The primary node 306 schedules the lending application nodes 302 based on node capacity.

Once lending application node instances are created, the primary node 302 continuously monitors the application nodes 302. When a failure occurs, traffic may be drained from the failing application nodes 302. The primary node 306 may shut down unstable lending application node 302 routines or the hardware executing the failing lending application nodes 302, the hosting software, or select servers in the cluster 304 while replicating the lending application node 302 or the server on-line in a desired operating state that preceded the failures while the system remains running (e.g., without interrupting the computing session). This fault-tolerant functionality keeps the SPV system running without interruption maintaining loan processing in real time. The failure detection may occur in response to a notice from a failing lending application node 302 or in response to the detection of a failure state via the monitoring that occurs at the primary node 306 and/or the coordinator cluster 308. The primary node 306 and the coordinator 308 monitors and tracks the various clusters executing one or more peer-ot-peer systems, limited lending pool systems, and/or turn-key lending pool systems.

Figure 4:
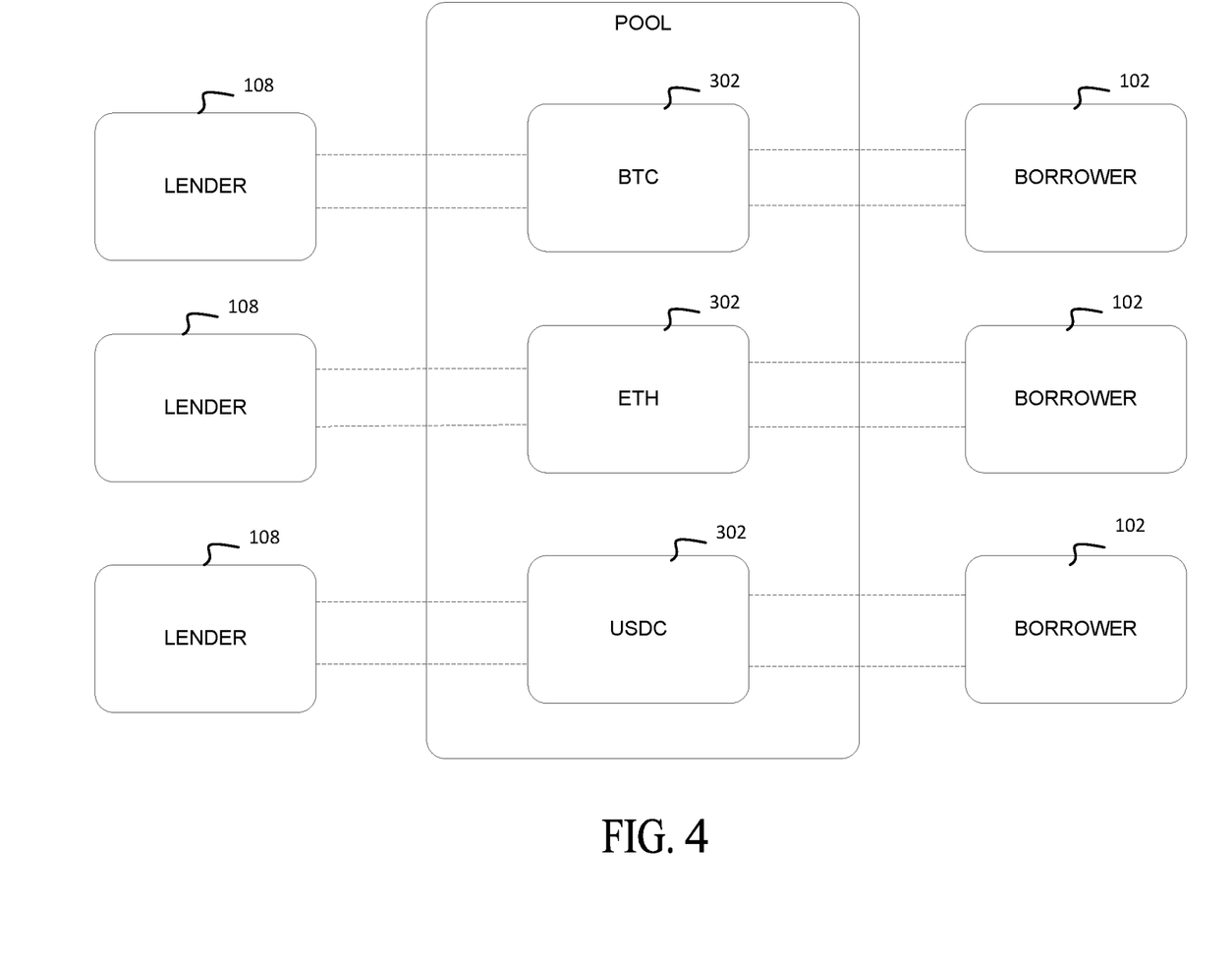
FIG. 4 illustrates containerized lending applications within a cluster interfacing client device.

FIG. 4 illustrates the isolation and the decoupling of the various loan application nodes 302 (three are shown) which may communicate with each other via microservices. FIG. 4 also illustrates how a centralized lending entity that may be a centralized exchange, (like Coinbase®) that can act as a central counterparty to facilitate lending. In this system, a clearing engine 826 (shown in FIG. 8) operating via the pooled debt and/or equity assets breaks the bond between the original lender the original borrower. At the end of every lending day, the clearing engine 826 becomes the borrower to every lender and lender to every borrower. Either party can therefore, close out his/her lending position through the clearing engine 826 without having to locate and obtain the original lending agreement of the original counterparty.

Figure 5:
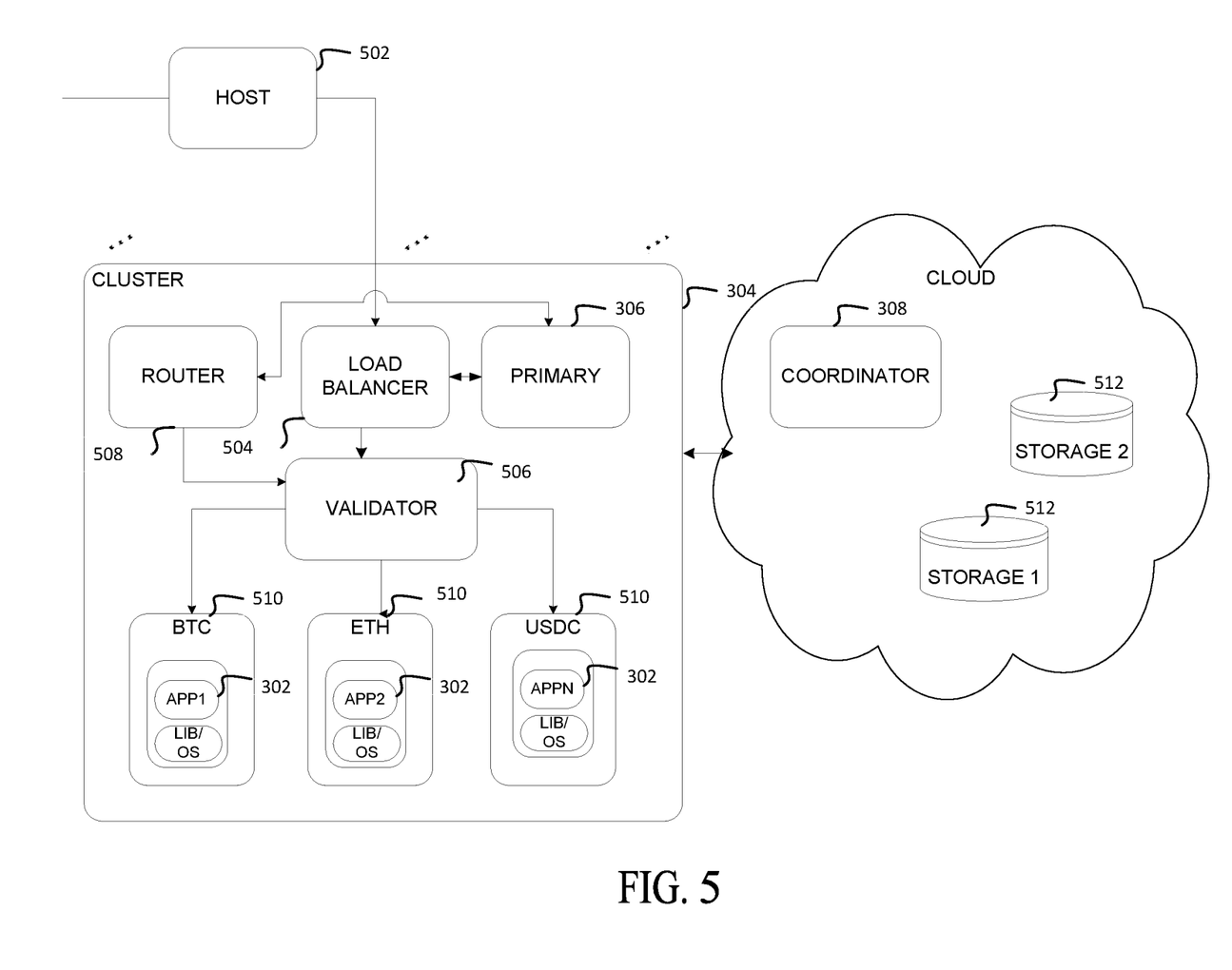
FIG. 5 is an alternate automated distribution system of FIG. 2.

FIG. 5 shows an exemplary enterprise integration of the SPV system. Requests flow through a page served by a host cluster 502 that passes requests to a load balancer 504 that distributes the borrowing/lend flow within the SPV clusters 304. When the SPV clusters 304 receive the request, the request is cross-referenced to an index stored in memory, the primary nodes 306 identifies where the requested lending application nodes reside through a validator 506 and router 508. Through a load-balancing delegation, the primary node 306 routes the request to the desired container 510 hosting the requested lending application nodes 302. The primary nodes 306 also tracks a state layer that follows the current and prior operating state of the lending application nodes 302. The primary nodes 306 knows when lending application nodes 302 fail and when to start replacement lending application nodes 302. Many lending application nodes 302 have one container 510 or interrelated containers. In a current implementation, each lending application node 302 services a particular asset type run in a separate container 510. The SPV system may replicate the various lending application nodes 302 and containers 510 in response to processing loads and/or maintenance conditions. Automated replication allows for vertical application scaling and ensures that there is never a missed lending opportunity, especially when the primary node 306 or the coordinator cluster 308 and its associated memory 512 take a lending application node 302 or server of the cluster 304 off-line.

Once the loan proceeds are received, they may be spent on or off the blockchain. Purchases may be restricted to the distributed or centralized entity that perform, verify, and/or enforce the loan functions such as a central depository. Generally, a central depository refers to an entity that holds cryptocurrency in bulk form for their participants and maintain ownership records of the cryptocurrency on their private books. The journal entries may include the dates, descriptions, and the amount of cryptocurrency held or on loan. In some systems, a double-entry system is used that includes a debit and credit entry to record a loan transaction that are equal and opposite entries when staking and transaction fees are included. The entries may include the date at which each short (long) lending positions occurred, the corresponding unique end-users (or customer numbers), identifiers, and the total amount of cryptocurrency pieces or Stablecoin dollars that was part of the loan. In this example, only a depository engine 828 (shown in FIG. 8) has the authority to commit transactions to the journals and general ledger. By retaining central authority of the cryptocurrency and/or designation of user rights in the cryptocurrency, the system provides improved record keeping, reduced reconciliations, more timely transactions, better quality data, and an established trust without requiring Proof-of-Work.

Figure 6:
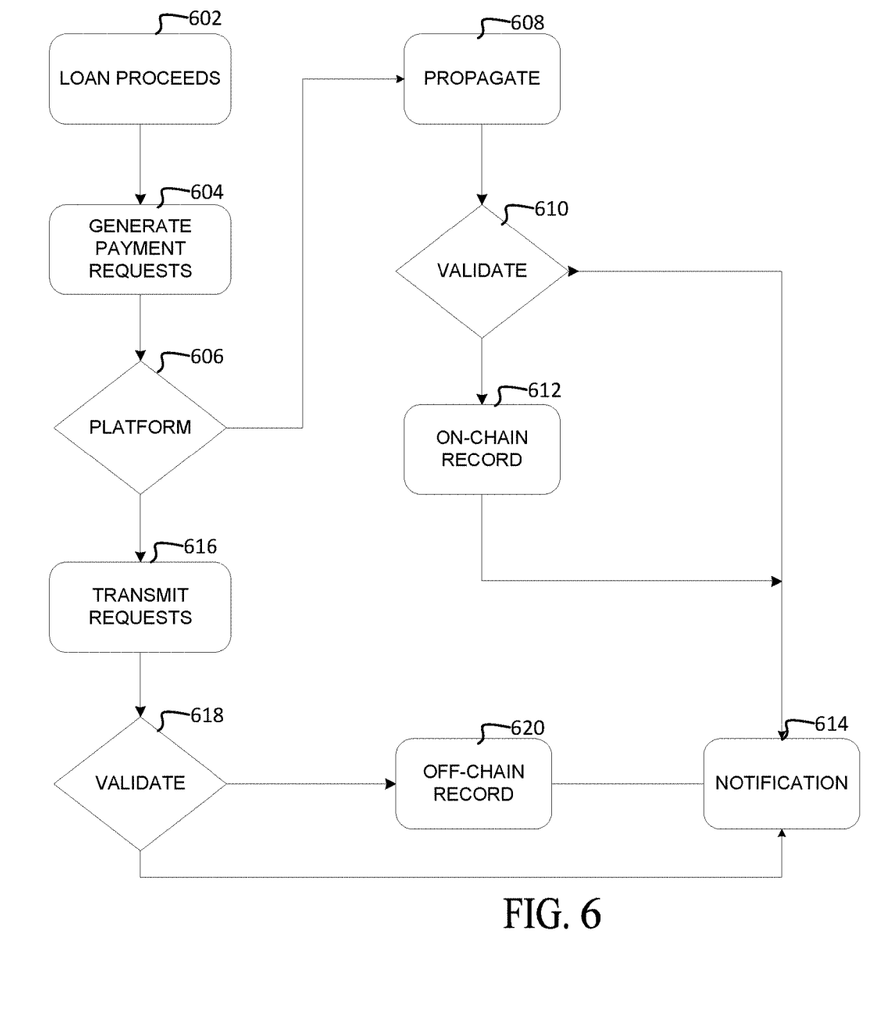
FIG. 6 is a process servicing payment request transacted through cold storage and a hot wallet.
Figure 7:
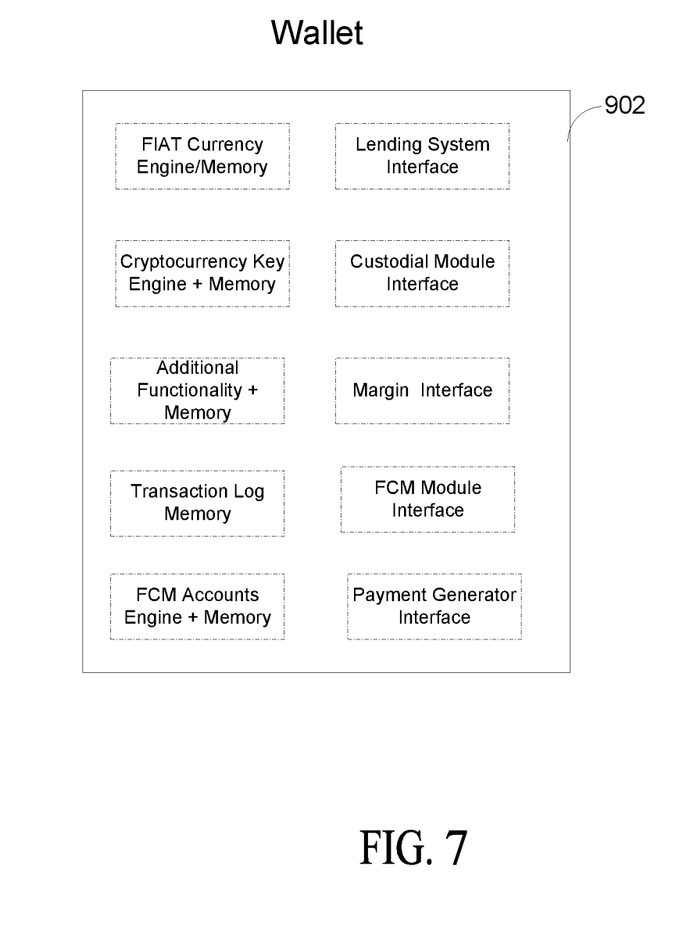
FIG. 7 is an exemplary wallet.

When cryptocurrency loan proceeds are spent outside of the depository, the loan proceeds are first recorded. In FIG. 6, the loan proceeds are recorded as a change of ownership on the blockchain when they are received at 602. A transaction request at 604 tells the bitcoin network that the owner has authorized the transfer to another through a payment request. A hot wallet application 702 shown in FIG. 7 may construct the transaction that references both an address of the new owner and an address of the current owner, or change address, which may not be the same address used to receive the loan proceeds. Essentially, the hot wallet 702 breaks the payment request into two payment requests. One to the designated recipient and one back to the original borrower so that the original borrower can spend the change output in a subsequent transaction. With the payment request formed at 604 and designated outside of the depository at 606, the payment request is propagated to a mining node, such as bitcoin node that then floods the request to the remaining bitcoin nodes at 608. Once verified by mining nodes through consensus rules at 610, the transaction is included in a candidate block that becomes part of the blockchain at 612 and a notification issue at 614.

If the payment request is transmitted to the depository making or servicing the loan at 616, the transaction is validated by confirming proof of ownership at 618, and recorded through journal entries 620. The entries may include the date at which each short (long) transaction positions occurred, the corresponding unique end-user's numbers (or customer numbers), identifiers, and the total amount of cryptocurrency pieces or Stablecoin dollars that was part of the transactions. In FIG. 6, the credits and debits entered onto the ledger may not add up to the same amount. Instead, the debits may exceed the credits with the difference representing the spread or staking fee, which is similar to the small fee that is collected by the miners that included the transaction on the blockchain ledger.

Figure 8:
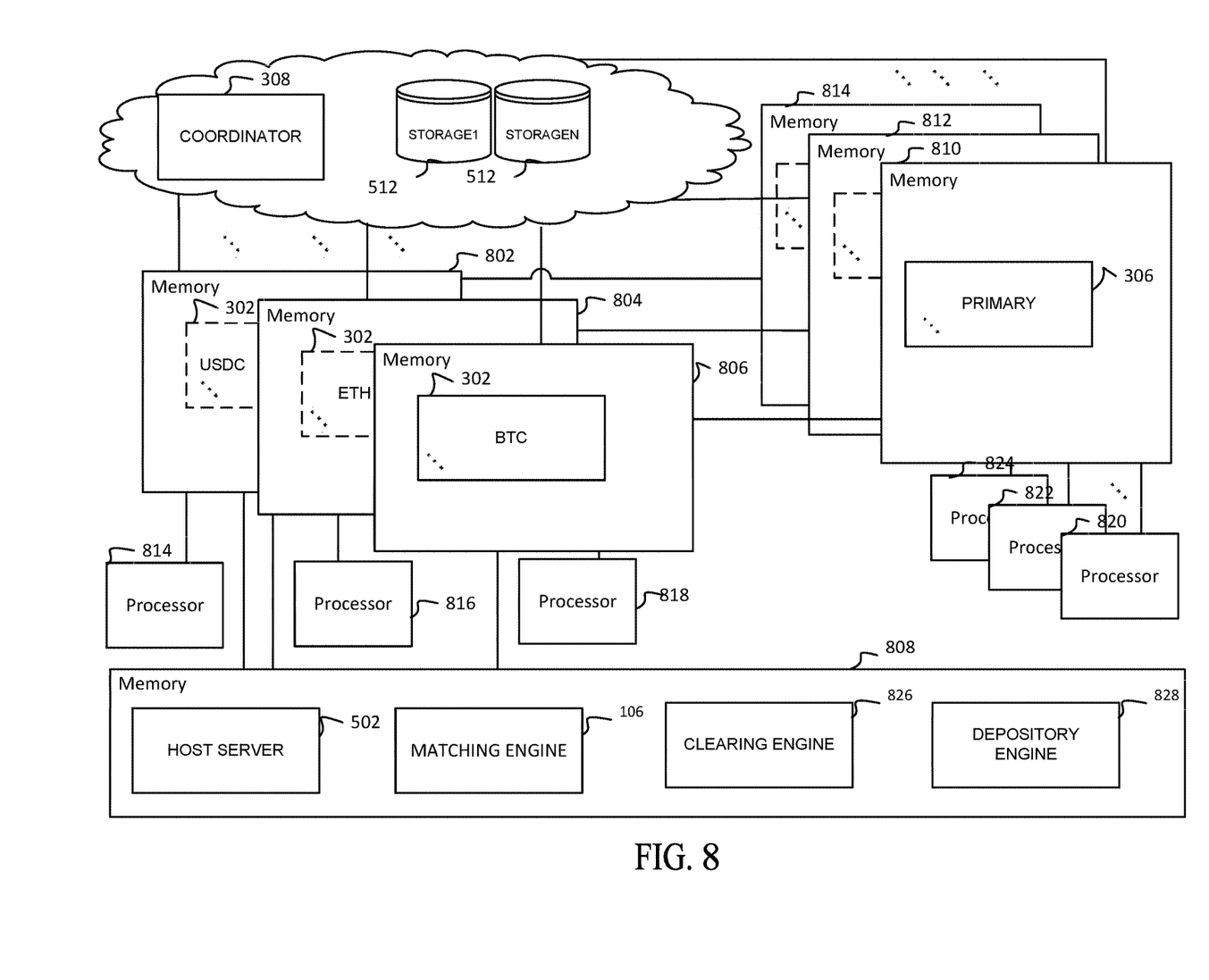
FIG. 8 is an alternate special purpose vehicle system.

FIG. 8 shows the hardware that enables the lending of debt and equity denominated in crypto. The SPV system comprise multiple processors 814-824 (e.g., CPUs, GPUs, etc.), multiple non-transitory media 802-814 such as multiple memories (the contents of which are accessible to the processors 814-824, respectively). The memories 802-814 may store instructions which when executed by one or more of the processors 814-824, respectively, causes the systems and methods to render some or all of the functionality associated with the lending application 302 and some or all of the functionality of the processes described. For example, the memory 802-814 may store instructions which when executed by one or more of the processors 814-824, respectively, causes the system to render the functionality associated with one or more lending application nodes 302, the host server 502, the primary nodes 306, the clearing engine 826, the depository engine 828 and the matching engine 106. In addition, data structures, temporary variables, metadata and other information are stored in one or more memories 802-814.

The processors 814-824 may comprise a single processor with multiple cores or multiple processors with multiple cores, on multiple devices or distributed across more than one system that run in parallel. The processors 814-824 may be hardware that executes computer executable instructions or computer code embodied in the memory 802-814 or in other memory to perform one or more features of the disclosed system. The processors 814-824 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memories 802-814 or storage disclosed may retain an ordered listing of executable instructions for implementing the functions described herein. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memories 802-814 may comprise a single device or multiple devices that may be disposed on one or more dedicated memory devices or on a processor or other similar device.

The memories 802-814 may also store computer code that may include instructions executable by the processor 814-824. The computer code may be written in any computer language, such as C, C++, assembly language, channel program code, and/or any combination of computer languages. The memories 802-814 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device accessible to a remote machine. In other embodiments, the logic or instructions are stored in a remote location for transfer through a computer networks or over wireless or tangible communication lines. In yet other embodiments, the logic or instructions may be stored and executed by multiple GPU servers.

While each of the processing shown and described herein operate automatically and operate independently, they also may be encompassed within other systems and methods and execute any number "n" of iterations of some or all of the process used to match borrowers to lenders, facilitate agreement on the terms, route crypto profiles, enforce, liquidate, and/or close out loans through the lending cycle. Alternate lending applications and clusters may include any combinations of structure and functions described or shown in one or more of the FIGS. These automated processing systems are formed from any combination of structures and functions described herein. The structures and functions may process additional or different input.

The term "coupled," disclosed in this description may encompass both direct and indirect coupling. Thus, a first and a second element are said to be coupled when they communicate directly with one another, as well as when the first element communicates through an intermediate component, which is connected directly or via one or more additional intermediate components to a second element. The term "substantially" or "about" may encompass a range that is largely, but not necessarily wholly, what is specified. It encompasses all but an insignificant amount, such as a variance within a range of five or ten percent of the given value. When devices are responsive to commands events, and/or requests, the actions and/or steps of the devices, such as the operations that devices are performing, necessarily occur as a direct or an indirect result of the preceding commands, events, actions, and/or requests. In other words, the operations occur as a result of the preceding operations. A device that is responsive to another requires more than an action (i.e., the device's response to) merely follow another action. An engine is a device or a processor that manages and manipulates data as programmed to execute the functionality associated with the device. A cryptocurrency is a digital medium of exchange that uses cryptography and a distributed ledger such as blockchain ledger to secure financial transactions, control the creation of additional crypto currency, and verify and record the transfer of the currency from one owner to the next via blocks. The term session refers to the time during which a program is running and responding to a user's input. It is the time during which a server and a client maintains a communication link and the program it is running accepts input and processes information during the communication exchange.

The disclosed SPV systems minimize financial and technical risk associated with an activity or a series of activities such lending debt or equity denominated in cryptocurrency. Through a sponsor or an originator, the systems transfer crypto assets through direct lending and/or lending pools. The assets are logically and electronically separated by asset types and may include any form of debt or equity and cryptocurrency. Ownership is tracked by user accounts, cold storage, hot wallets, addresses, and entities including centralized entities or exchanges that may maintain user accounts.

Eligible contract participants, retail customers, and/or centralized entities may provide the crypto assets loaned for the repayment of value, interest in cryptocurrency (not fiat), and/or other considerations. In an exemplary peer-to-peer system, matching engines match borrowers to lenders, allowing the system to automatically track and enforce positions, interest payments in cryptocurrency (not fiat), margin requirements, forced liquidations and/or loan closures. In this system, the collateralized debt and/or equity and margin requirements are customized to the investors with the lender bearing the risk of default. In exemplary limited lending-pool systems, a matching engine matches borrowers to lenders allowing the system to automatically track and enforce positions, interest payments in cryptocurrency, margin requirements, forced liquidations, and/or loan closures. In this system, loan terms and margin requirements are set by predetermined rules via one or more downloadable crypto profiles and the lenders and borrowers bear the risk of default. In exemplary turn-key lending-pool systems, the systems' matching engines match borrowers to lenders and automatically track and enforce positions, interest payments in crypto, margin requirements, forced liquidations and/or loan closures. Loan terms and margin requirements, amongst the other requirements, are assigned by predetermined rules via the downloadable crypto profiles, lenders and borrowers bear the default risk, and margin trading occur through the system's user interfaces.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method comprising:
receiving a plurality of crypto profiles including first and second crypto profiles, the first crypto profile including first customizable rules for Bitcoin and first operating state information for a Bitcoin lending application, and the second crypto profile including second customizable rules for Ethereum and second operating state information for an Ethereum lending application;
initializing a plurality of containerized lending applications including a containerized Bitcoin lending application and a containerized Ethereum lending application by initializing (1) the containerized Bitcoin lending application using the first customizable rules for Bitcoin and the first operating state information and (2) the containerized Ethereum lending application using the second customizable rules for Ethereum and the second operating state information;
linking the crypto profiles to a matching engine before the containerized lending applications and the matching engine match a plurality of borrower requests for a debt or an equity denominated in a cryptocurrency to a plurality of lending requests;
in response to detecting a failing application of the containerized lending applications, (1) replicating a corresponding containerized application to replace the failing application by initializing the corresponding containerized application in a pre-failure operating state of the failing application and (2) draining traffic from the failing application to the corresponding containerized application, such that:
  (i) in response to the failing application being the containerized Bitcoin lending application, the corresponding containerized application is initialized using the first customizable rules for Bitcoin and an instance of the first operating state information associated with the pre-failure operating state;
  (ii) in response to the failing application being the containerized Ethereum lending application, the corresponding containerized application is initialized using the second customizable rules for Ethereum and an instance of the second operating state information associated with the pre-failure operating state; and
  (iii) the corresponding containerized application completes processing of a computing session that was being handled by the failing application; and
collecting, by the matching engine, cryptocurrency payments transmitted in response to the use of the debt or the equity by a borrower in cryptocurrency;
where each containerized lending application of the containerized lending applications comprises executable software, runtime code, system tools, and system libraries that enable the containerized lending application to run on a plurality of computing environments without modification.

2. The method of claim 1, wherein a first computing cluster of a plurality of computing clusters includes the containerized lending applications, and wherein a second computing cluster of the computing clusters includes other containerized lending applications respectively corresponding to cryptocurrencies different from one another, the other containerized lending applications of the second computing cluster including at least one containerized Bitcoin lending application and at least one containerized Ethereum lending application.

3. The method of claim 2, further comprising:
receiving, at the computing clusters including the first and second computing clusters, a request associated with a first cryptocurrency type; and
routing, via coordination of the first and second computing clusters that received the request, to a given containerized lending application that corresponds to the first cryptocurrency type and that is part of the first computing cluster,
wherein the coordination includes selecting the given containerized lending application over another containerized lending application that also corresponds to the first cryptocurrency type and that is part of the second computing cluster.

4. The method of claim 1, further comprising:
in response to detecting spending of Bitcoin loan proceeds by a borrower, causing, by containerized Bitcoin lending application, a hot wallet to generate a blockchain transaction including an address of a new owner, an address of a current owner, and a change address.

5. The method of claim 1, further comprising:
shutting down the failing application without interrupting the computing session by performing the replication of the corresponding containerized application and the draining of the traffic from the failing application prior to completing the shutting down of the failing application.

6. The method of claim 1, further comprising:
tracking, via a state layer, current and prior operating states of the containerized lending applications that correspond to respective operating states of the containerized lending applications,
wherein replicating the corresponding containerized application comprises replicating the corresponding containerized application based on the tracking of the current and prior operating states of the failing application.

7. The method of claim 1, further comprising:
continuously monitoring the containerized lending applications; and
detecting the failing application by detecting, based on the continuous monitoring, a failure state of the failing application of the containerized lending applications,
wherein the replication of the corresponding containerized application and the draining of the traffic from the failing application are performed in response to the detection of the failure state of the failing application.

8. One or more non-transitory computer-readable media comprising instructions that, when executed by one or more processors, cause operations comprising:
receiving a plurality of crypto profiles including first and second crypto profiles, the first crypto profile including first customizable rules for a first cryptocurrency type and first operating state information for a lending application corresponding to the first cryptocurrency type, and the second crypto profile including second customizable rules for a second cryptocurrency type and second operating state information for a lending application corresponding to the second cryptocurrency type;
initializing a plurality of containerized lending applications including a first containerized lending application corresponding to the first cryptocurrency type and a second containerized lending application corresponding to the second cryptocurrency type by initializing (1) the first containerized lending application using the first customizable rules and the first operating state information and (2) the second containerized lending application using the second customizable rules and the second operating state information;

linking the crypto profiles to a matching engine before the containerized lending applications and the matching engine match a plurality of borrower requests for a debt or an equity denominated in a cryptocurrency to a plurality of lending requests;

in response to detecting a failing application of the containerized lending applications, (1) replicating a corresponding containerized application to replace the failing application by initializing the corresponding containerized application in a pre-failure operating state of the failing application and (2) draining traffic from the failing application to the corresponding containerized application, such that:

(i) in response to the failing application being the first containerized lending application, the corresponding containerized application is initialized using the first customizable rules and an instance of the first operating state information associated with the pre-failure operating state;

(ii) in response to the failing application being the second containerized lending application, the corresponding containerized application is initialized using the second customizable rules and an instance of the second operating state information associated with the pre-failure operating state; and (iii) the corresponding containerized application completes processing of a computing session that was being handled by the failing application; and collecting, by the matching engine, cryptocurrency payments transmitted in response to the use of the debt or the equity by a borrower in cryptocurrency;

where each containerized lending application of the containerized lending applications comprises executable software, runtime code, system tools, and system libraries that enable the containerized lending application to run on a plurality of computing environments without modification.

9. The one or more media of claim 8, wherein a first computing cluster of a plurality of computing clusters includes the containerized lending applications, and wherein a second computing cluster of the computing clusters includes other containerized lending applications respectively corresponding to cryptocurrencies different from one another, the other containerized lending applications of the second computing cluster including at least one containerized lending application corresponding to the first cryptocurrency type and at least one containerized lending application corresponding to the second cryptocurrency type.

10. The one or more media of claim 9, the operations further comprising:

receiving, at the computing clusters including the first and second computing clusters, a request associated with the first cryptocurrency type; and routing, via coordination of the first and second computing clusters that received the request, to a given containerized lending application that corresponds to the first cryptocurrency type and that is part of the first computing cluster, wherein the coordination includes selecting the given containerized lending application over another containerized lending application that also corresponds to the first cryptocurrency type and that is part of the second computing cluster.

11. The one or more media of claim 8, the operations further comprising:

in response to detecting spending of loan proceeds corresponding to the first cryptocurrency type by a borrower, causing, by the first containerized lending application, a hot wallet to generate a blockchain transaction including an address of a new owner, an address of a current owner, and a change address.

12. The one or more media of claim 8, the operations further comprising:

shutting down the failing application without interrupting the computing session by performing the replication of the corresponding containerized application and the draining of the traffic from the failing application prior to completing the shutting down of the failing application.

13. The one or more media of claim 8, the operations further comprising:

tracking, via a state layer, current and prior operating states of the containerized lending applications that correspond to respective operating states of the containerized lending applications, wherein replicating the corresponding containerized application comprises replicating the corresponding containerized application based on the tracking of the current and prior operating states of the failing application.

14. The one or more media of claim 8, the operations further comprising:

continuously monitoring the containerized lending applications; and detecting the failing application by detecting, based on the continuous monitoring, a failure state of the failing application of the containerized lending applications, wherein the replication of the corresponding containerized application and the draining of the traffic from the failing application are performed in response to the detection of the failure state of the failing application.

15. A system comprising:

one or more processors executing instructions that, when executed by the one or more processors, cause operations comprising:

receiving a plurality of crypto profiles including first and second crypto profiles, the first crypto profile including first customizable rules for a first cryptocurrency type and first operating state information for a lending application corresponding to the first cryptocurrency type, and the second crypto profile including second customizable rules for a second cryptocurrency type and second operating state information for a lending application corresponding to the second cryptocurrency type;

initializing a plurality of containerized lending applications including a first containerized lending application corresponding to the first cryptocurrency type and a second containerized lending application corresponding to the second cryptocurrency type by initializing (1) the first containerized lending application using the first customizable rules and the first operating state information and (2) the second containerized lending application using the second customizable rules and the second operating state information;

linking the crypto profiles to a matching engine before the containerized lending applications and the matching engine match a plurality of borrower requests for a debt or an equity denominated in a cryptocurrency to a plurality of lending requests;

in response to detecting a failing application of the containerized lending applications, (1) replicating a corresponding containerized application to replace the failing application by initializing the corresponding containerized application in a pre-failure operating state of the failing application and (2) draining traffic from the failing application to the corresponding containerized application, such that:

(i) in response to the failing application being the first containerized lending application, the corresponding containerized application is initialized using the first customizable rules and an instance of the first operating state information associated with the pre-failure operating state;

(ii) in response to the failing application being the second containerized lending application, the corresponding containerized application is initialized using the second customizable rules and an instance of the first second operating state information associated with the pre-failure operating state; and   (iii) the corresponding containerized application completes processing of a computing session that was being handled by the failing application; and collecting, by the matching engine, cryptocurrency payments transmitted in response to the use of the debt or the equity by a borrower in cryptocurrency;

where each containerized lending application of the containerized lending applications comprises executable software, runtime code, system tools, and system libraries that enable the containerized lending application to run on a plurality of computing environments without modification.

16. The system of claim 15, wherein a first computing cluster of a plurality of computing clusters includes the containerized lending applications, and wherein a second computing cluster of the computing clusters includes other containerized lending applications respectively corresponding to cryptocurrencies different from one another, the other containerized lending applications of the second computing cluster including at least one containerized lending application corresponding to the first cryptocurrency type and at least one containerized lending application corresponding to the second cryptocurrency type, the operations further comprising:

receiving, at the computing clusters including the first and second computing clusters, a request associated with the first cryptocurrency type; and routing, via coordination of the first and second computing clusters that received the request, to a given containerized lending application that corresponds to the first cryptocurrency type and that is part of the first computing cluster, wherein the coordination includes selecting the given containerized lending application over another containerized lending application that also corresponds to the first cryptocurrency type and that is part of the second computing cluster.

17. The system of claim 15, the operations further comprising:

in response to detecting spending of loan proceeds corresponding to the first cryptocurrency type by a borrower, causing, by the first containerized lending application, a hot wallet to generate a blockchain transaction including an address of a new owner, an address of a current owner, and a change address.

18. The system of claim 15, the operations further comprising:

shutting down the failing application without interrupting the computing session by performing the replication of the corresponding containerized application and the draining of the traffic from the failing application prior to completing the shutting down of the failing application.

19. The system of claim 15, the operations further comprising:

tracking, via a state layer, current and prior operating states of the containerized lending applications that correspond to respective operating states of the containerized lending applications, wherein replicating the corresponding containerized application comprises replicating the corresponding containerized application based on the tracking of the current and prior operating states of the failing application.

20. The system of claim 15, the operations further comprising:

continuously monitoring the containerized lending applications; and detecting the failing application by detecting, based on the continuous monitoring, a failure state of the failing application of the containerized lending applications, wherein the replication of the corresponding containerized application and the draining of the traffic from the failing application are performed in response to the detection of the failure state of the failing application.

* * * * *